United States Patent Office.

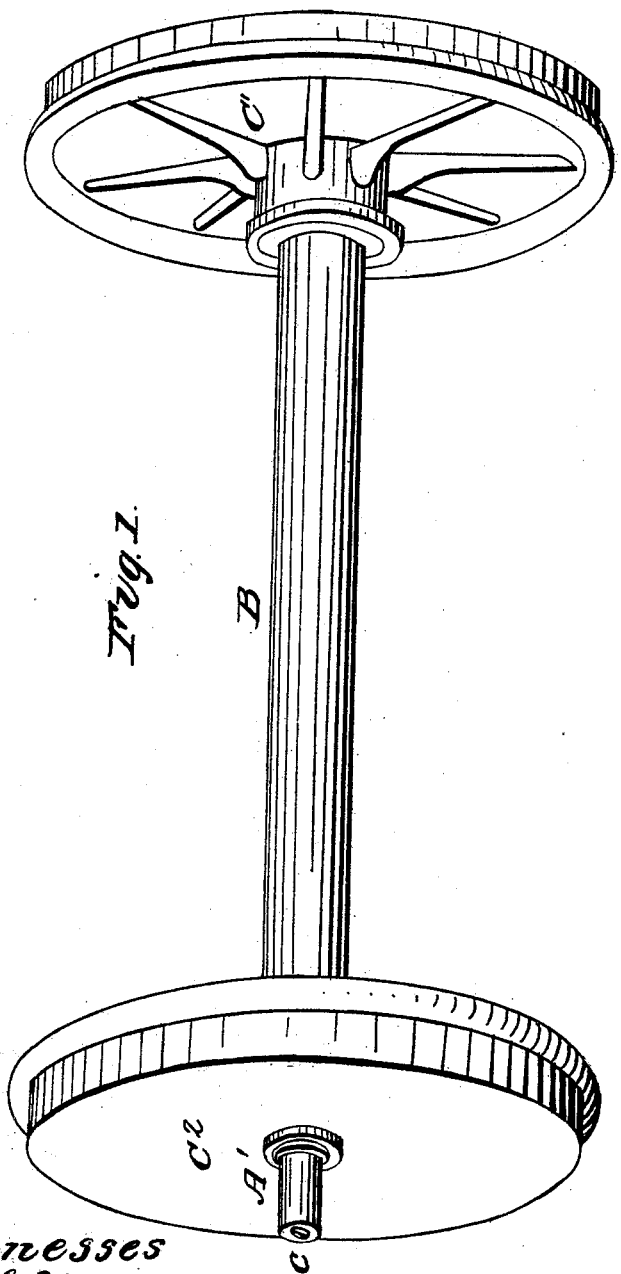

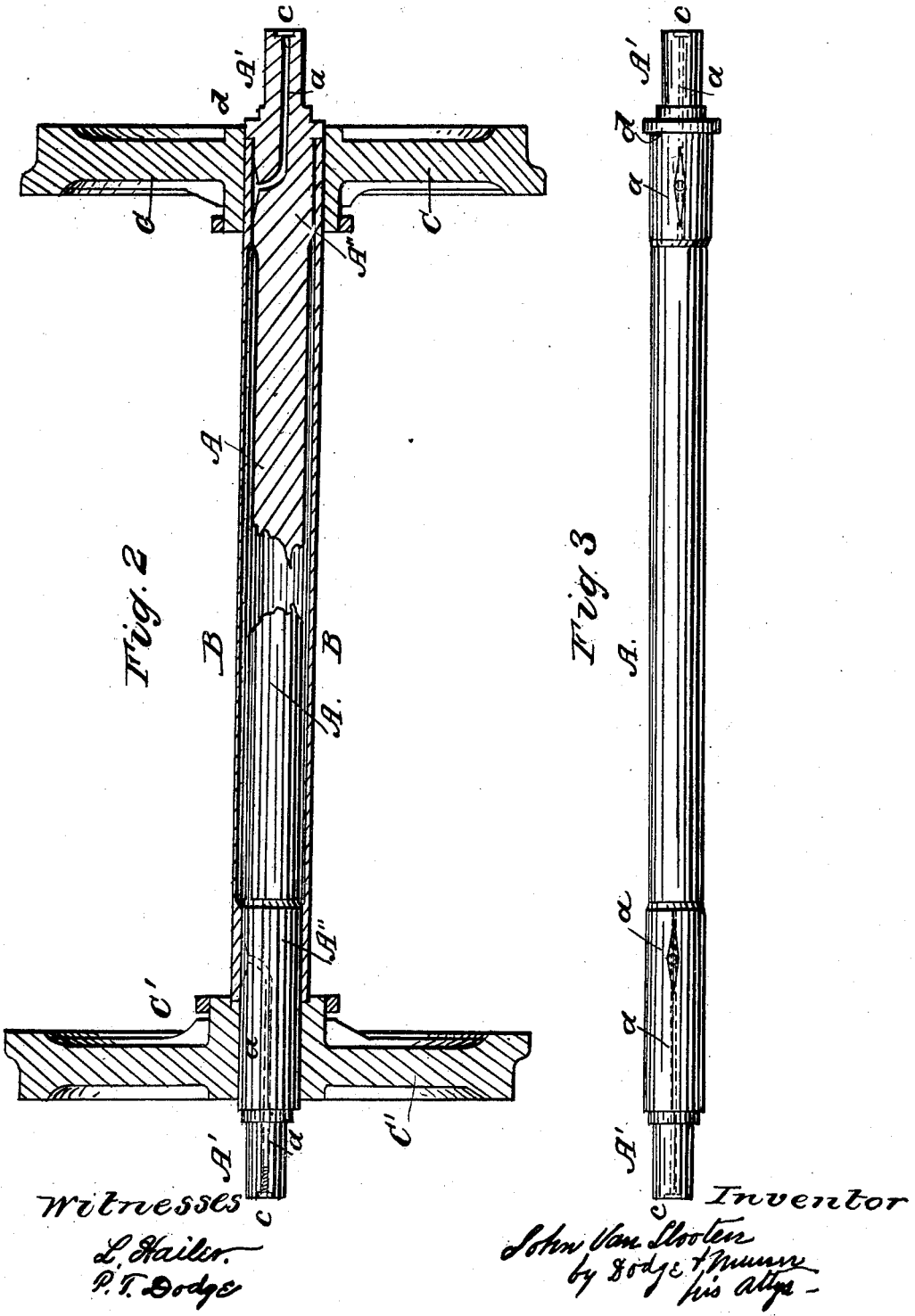

JOHN VAN SLOOTEN, OF NEW ORLEANS, LOUISIANA.

Letters Patent No. 90,321, dated May 18, 1869.

IMPROVED RAILWAY-CAR AXLE.

The Schedule referred to in these Letters Patent and making part of the same.

*To all whom it may concern:*

Be it known that I, JOHN VAN SLOOTEN, of New Orleans, in the parish of Orleans, and State of Louisiana, have invented certain new and useful Improvements in Railroad-Car Axles; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to car-axles, and consists in a novel construction and arrangement of a tubular and solid axle, so as to form a double one, in order that the wheels, when attached rigidly to each respectively, may run independent of one another, and also so that the bearings of the tubular axle may be lubricated in a novel manner.

In the drawings—

Figure 1 is a perspective view,

Figure 2 is a longitudinal section, and

Figure 3 is a plan view of the solid axle.

As is well known, when wheels are attached rigidly to a solid axle, there is more friction in turning curves than when running on parallel lines, that the friction is greatly increased when the wheels differ in size, and run on the same parallel lines.

I am aware that various kinds of combination-axles have been constructed, to avoid these difficulties, but none of them, so far as I know, have fully succeeded in practice.

The object of my invention is to accomplish this desired result.

I construct a solid axle, A, in a manner similar to those generally used for railroad-cars, providing it with bearings A′, enlargements A″, and a collar, d, as clearly shown in figs. 2 and 3, and also with channels a, extending from its ends, and opening through its enlargements A″, as shown by the dotted lines in the same figures.

I then construct a tubular axle, B, and to one end of it rigidly attach, by any suitable means, the car-wheel C, so as to leave a recess between the end of the axle and the outside of the hub of the wheel.

This tubular axle I then slide upon the solid axle A, when its collar d will fit smoothly in the recess in the wheel C, and hold the latter in position.

On the end of the solid axle A, opposite that upon which the collar d is placed, I attach the car-wheel C′ rigidly. The inner face of its hub I provide with a recess, into which the end of the tubular axle B fits smoothly, all as clearly shown in fig. 2.

The tubular axle is made to fit nicely about the enlargements A″ on the solid axle, and to form a complete connection between the two wheels about the solid axle.

With an axle thus constructed, of a solid and tubular axle, having a wheel attached rigidly to each respectively, as described, and so that each may run independently of the other, it is obvious that in turning curves, there will be no unusual friction, and that when, from any cause, one wheel may be larger than the other, their revolutions will readily adjust themselves to suit each other.

As the solid axle extends through and beyond the wheels, and the tubular one forms a complete connection between them, it is obvious that the combined axle, thus constructed, forms a very strong and durable one.

The outer ends of the channels a, I close with a screw, c, or other suitable device, and when it is desirable or necessary to lubricate the bearings of the tubular axle, or the enlargements A″ of the solid axle, I remove the screws c, and introduce the lubricant through the channels a.

As these axles turn upon each other only when the wheels differ in size, or in turning curves, it is obvious that a very small quantity of the lubricant can at any time be required, and that the channels a will answer for the purpose of introducing it.

Having thus described my invention,

What I claim, is—

A car-axle, consisting of the solid axle A, provided with the enlargements A″ and collar d, and having the wheel C′ rigidly attached, in combination with the tubular axle B, with the wheel C rigidly attached, when constructed and arranged substantially as herein described.

J. VAN SLOOTEN.

Witnesses:
WM. McCULLOCH,
FRANCIS CARROLL.